United States Patent
Chervoni et al.

(10) Patent No.: US 11,075,944 B2
(45) Date of Patent: Jul. 27, 2021

(54) SYSTEM AND METHOD FOR PROTECTION OF COMPUTER NETWORKS AGAINST MAN-IN-THE-MIDDLE ATTACKS

(71) Applicant: Source Ltd., Valletta (MT)

(72) Inventors: Nir Chervoni, Rishon Lezion (IL); Ilya Dubinsky, Kefar Sava (IL)

(73) Assignee: SOURCE LTD., Valletta (MT)

( * ) Notice: Subject to any disclaimer, the term of this patent is extended or adjusted under 35 U.S.C. 154(b) by 309 days.

(21) Appl. No.: 16/223,194

(22) Filed: Dec. 18, 2018

(65) Prior Publication Data
US 2020/0195682 A1    Jun. 18, 2020

(51) Int. Cl.
*H04L 29/06*    (2006.01)
*H04L 9/08*    (2006.01)

(52) U.S. Cl.
CPC ........ *H04L 63/1441* (2013.01); *H04L 9/0819* (2013.01); *H04L 9/0861* (2013.01); *H04L 63/0428* (2013.01)

(58) Field of Classification Search
CPC ............. H04L 63/0428; H04L 63/1441; H04L 9/0819; H04L 63/1408; H04L 9/0861; H04L 9/3263; H04L 63/123; H04L 9/3239; H04L 2209/38; H04L 63/1483
See application file for complete search history.

(56) References Cited

U.S. PATENT DOCUMENTS

2002/0136226 A1 * 9/2002 Christoffel .......... H04W 12/001
                                                             370/401
2017/0005795 A1 * 1/2017 Gan ...................... H04L 63/061

FOREIGN PATENT DOCUMENTS

WO    WO-2018073482 A1 * 4/2018 ............ H04W 48/16

* cited by examiner

*Primary Examiner* — Harunur Rashid
(74) *Attorney, Agent, or Firm* — Pearl Cohen Zedek Latzer Baratz LLP

(57) ABSTRACT

A system and a method of detection of an attack on a computer network including a plurality of nodes, the method including: associating the plurality of nodes with each other in a distributed ledger configuration; producing, by a requesting node of the plurality of nodes, a request to set a value of at least one key derivation parameter; performing a vote of confidence among a subset of the plurality of nodes regarding the validity of the request; and detecting an attack on at least one node of a plurality of nodes according to the vote of confidence.

19 Claims, 5 Drawing Sheets

---

S1005: Associating a plurality of nodes on a computer network with each other in a distributed ledger configuration.

S1010: Producing, by a requesting node of the plurality of nodes, a request to set a value of at least one key derivation parameter.

S1015: Performing a vote of confidence among a subset of the plurality of nodes regarding the validity of the request.

S1020: Detecting an attack on at least one node of a plurality of nodes according to the vote of confidence.

SYSTEM AND METHOD FOR PROTECTION OF COMPUTER NETWORKS AGAINST MAN-IN-THE-MIDDLE ATTACKS

FIELD OF THE INVENTION

The present invention relates generally to computer networks. More specifically, the present invention relates to protection of computer networks against attacks such as man-in-the-middle attacks.

BACKGROUND OF THE INVENTION

Secure exchange of data over potentially compromised communications networks may require the ability to exchange cryptographic keys or independently generate them on either end of a communication channel. This is particularly relevant in the world of connected devices (e.g. devices such as computers, appliances, transportation equipment, etc. which can exchange data), where the number of entities that require protected communication is growing rapidly.

Methods for generation of one-time keys as known in the art typically assume that one or more computing devices in a network are initialized in a secure way and derive one-time secure keys for particular transactions of data according to a predefined algorithm.

For example, Point-of-Sale (POS) terminals associated in a computer network of a commercial organization (e.g., a shopping center) may be pre-loaded with a master key. A first terminal may derive a one-time secure key from its master key according to a predefined parameter, referred to as a key-derivation parameter (KDP). This procedure is independently repeated by device counterparts (e.g., by a second terminal, by a terminal management system, etc.) and the independently derived key is used to decipher secure communication from the first terminal.

The KDP, according to which the first terminal may derive the one-time key from the master key may, for example be a sequential parameter, such as a serial number associated with a message on a message counter, a serial number of a financial transaction and the like.

As known in the art, a Man-in-the-Middle (MITM) attack is an attack where a perpetrator secretly relays and possibly alters the communication between two parties who believe they are directly communicating with each other. In the example above, a perpetrator may have compromised a communication channel between one or more computing devices (e.g., POS terminals, terminal management system etc.) of the network and a banking server and may be relaying messages between these parties.

As the relayed messages may still be encrypted by one-time secure keys, the perpetrator may still not be able to decipher their content. The perpetrator may consequently attempt to inject a key derivation parameter, in order to determine the value of at least one one-time key, and thus be able to decipher the relayed messages. This type of attack is referred to in the art as a targeted-key attack or selected-key attack.

Commercially available solutions for distribution of key derivation parameters (KDPs) rely on a centralized scheme for distribution of key derivation parameters (e.g., by a central server) or on a fully predictable scheme, such as sequential numeration. Such configurations are especially susceptible to targeted-key attacks, because a perpetrator may only need to hack or attack a single node of the computer network, or act as a man-in-the-middle in order to successfully inject a key-derivation parameter into communication between nodes and undetectably gain access to encrypted data traffic on the network.

A system and a method of secure sharing of key-derivation parameters is therefore required.

SUMMARY OF THE INVENTION

Embodiments of the present invention include a system and a method for generation and sharing of peer-to-peer secure keys between nodes of a computer network. Embodiments may initialize the network nodes with a master key value, produce a KDP for deriving a one-time secure key, and securely share the KDP by two or more nodes of the computer network by utilizing distributed ledger technology, as explained herein. Embodiments may therefore allow random generation and secure distribution of key derivation parameters in a manner that is protected from MITM KDP and/or secure key injection attacks.

Embodiments of the invention may include a system and a method of detection of an attack on a computer network including a plurality of nodes. The method may include:
    associating the plurality of nodes with each other in a distributed ledger configuration;
    producing, by a requesting node of the plurality of nodes, a request to set a value of at least one key derivation parameter;
    performing a vote of confidence among a subset of the plurality of nodes regarding the validity of the request; and
    detecting an attack on at least one node of a plurality of nodes according to the vote of confidence.

Embodiments of the invention may be implemented to detect and/or defend against an attack on a computer network, where the attack may be one of a man-in-the-middle (MITM) attack, a selected key attack and a targeted key attack.

Embodiments may include loading to each of the plurality of nodes a proprietary private node key. A first node may be configured to producing a request to set a value of at least one key derivation parameter by:
    selecting a value of at least one key derivation parameter;
    sending a request message to the plurality of nodes other than the first node; and
    signing the request message with the proprietary private node key.

At least one second node may be configured to:
    validate the requesting node's signature of the request; and
    store the key derivation parameter value in an entry of a local copy stored at the second node of the distributed ledger, based on the validation.

According to some embodiments, each of the plurality of nodes may be loaded with a master key. At least one first node may:
    derive a secure key according to the master key and according to a key derivation parameter stored on a local copy at the first node of the distributed ledger;
    encrypt a message according to the derived key; and
    send the encrypted message, alongside an identification of the distributed ledger entry, to the at least one second node in the computer network.

According to some embodiments the at least one second node may request to perform a vote of confidence from the subset of nodes, regarding the validity of the key derivation parameter value in the identified distributed ledger entry. If the vote of confidence passes, then the second node may derive a secure key according to the key derivation parameter value and decipher the encrypted message. If the vote of confidence fails, then the second node may identify the key derivation parameter value as pertaining to a suspected attack on the computer network and perform at least one preventive measure thereupon.

The preventive measures may be selected from a list which may include for example: producing a notification regarding the suspected attack, blocking at least one message originating from the first node, quarantining at least one message originating from the first node, and producing, by a node other than the first node, a request to change a value of the at least one key derivation parameter.

The computer network may include a plurality of separate entities of homogenous network topology. Each entity may include one or more nodes, and the nodes of all entities are associated in a distributed ledger configuration.

At least one first node of a first homogenous network entity may be communicatively connected to at least one second node of a separate, second homogenous network entity over a secure connection. For example, the secure network connections between homogenous network entities may include any known physical or logical network security module (e.g., a Firewall, a demilitarized-zone network (DMZ), and the like) as known in the art, to facilitate secure traffic of messages that are associated with votes of confidence of the distributed ledger configuration 30.

According to some embodiments, the at least one first node and the at least one second node may be implemented as nodes in a Virtual Private Network (VPN). The secure network connection may be performed over the computer network.

Additionally, or alternately, the at least one first node and the at least one second node may be communicatively connected by a secure network connection separate from the computer network.

The computer network may include at least one processing center, separate from the plurality of entities of homogenous network topology. In some embodiments, producing a request to set a value of at least one key derivation parameter may be performed by the processing center.

Embodiments of the present invention may include a system for detection and/or deflection of an attack on a computer network and may include a plurality of nodes. Each node of the plurality of nodes may include:
  a non-transitory memory device, wherein modules of instruction code are stored and
  a processor associated with the memory device and configured to execute the modules of instruction code. Upon execution of the modules of instruction code, the processor may be further configured to perform at least one method of detection and/or deflection of an attack on a computer network.

Embodiments of the present invention may include a method of detection, by at least one processor, of an attack on a computer network that may include a plurality of nodes. The method may include:
  creating a distributed ledger recording transactions among the plurality of nodes;
  creating, by at least one node, a request to set a value of at least one key derivation parameter;
  voting, among a subset of the plurality of nodes, whether or not the request is valid; and
  detecting an attack if the outcome of the vote is that the request is not valid.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
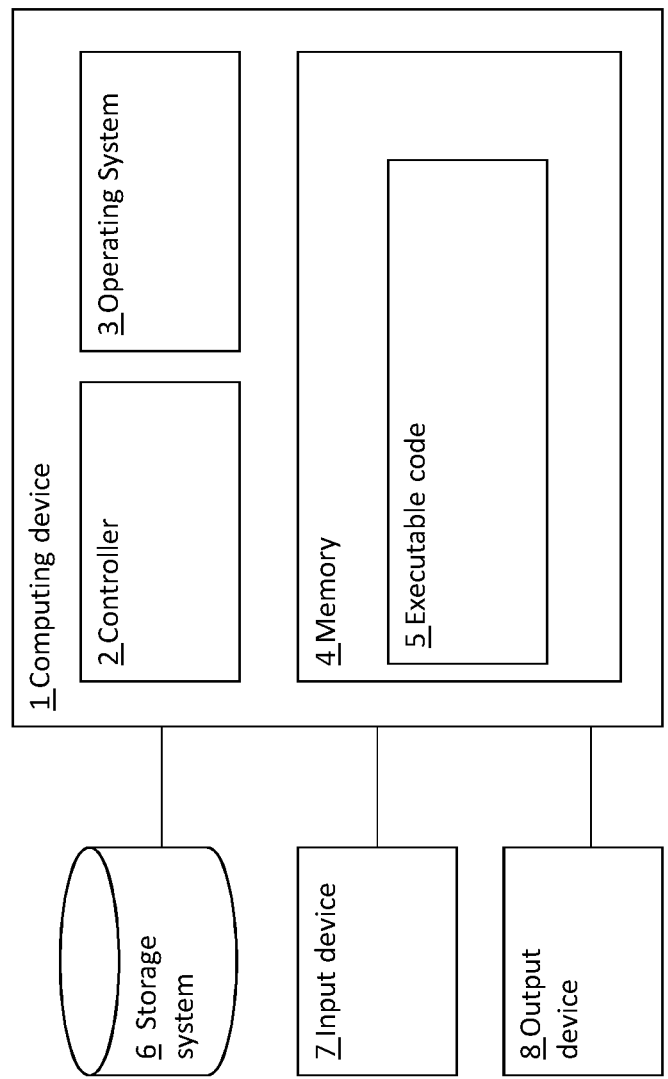
FIG. 1 is a block diagram, depicting a computing device which may be included in a system for protection of computer networks against attacks such as man-in-the-middle attacks, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention disclose a method and a system for generation and sharing of peer-to-peer secure keys between nodes of a computer network, to protect the network against MITM attacks, and specifically from attacks commonly referred to in the art as selected-key attacks. The term 'node' is used herein to refer to a computing device (e.g., as elaborated herein in relation to FIG. 1), that may be included within a computer communication network, and may be interconnected with other such nodes in the network. For example, a node may be a POS terminal, a household device (e.g. a thermostat, a refrigerator), a component in an automobile, a vehicle itself, etc. Nodes may communicate with each other for many reasons (e.g. automobiles exchanging position location, home appliances sending status information, etc.).

Reference is now made to FIG. 1, which is a block diagram depicting a computing device, which may be included within an embodiment of a system for protection of computer networks against man-in-the-middle attacks, according to some embodiments.

Computing device 1 may include a controller 2 that may be, for example, a central processing unit (CPU) processor, a chip or any suitable computing or computational device, an operating system 3, a memory 4, executable code 5, a storage system 6, input devices 7 and output devices 8. Controller 2 (or one or more controllers or processors, possibly across multiple units or devices) may be configured to carry out all or part of methods described herein, and/or to execute or act as the various modules, units, etc. More than one computing device 1 may be included in, and one or more computing devices 100 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of Computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM.

Executable code 5 may be any executable code, e.g., an application, a program, a process, task or script. Executable code 5 may be executed by controller 2 possibly under control of operating system 3. For example, executable code 5 may be an application that may protect computer networks against man-in-the-middle attacks according to some embodiments as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 6 and may be loaded from storage system 6 into memory 120 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

Figure 2:
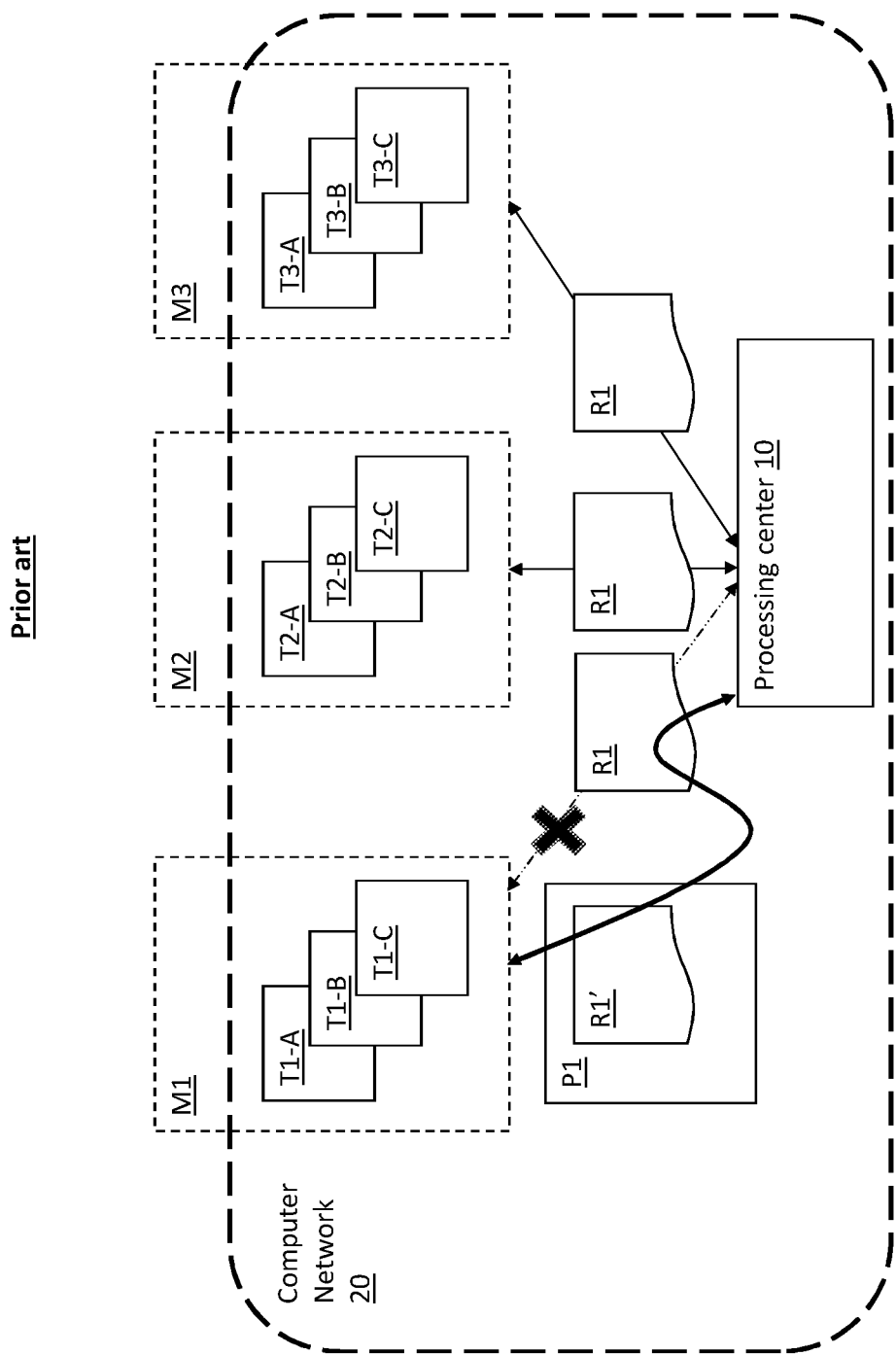
FIG. 2 is a block diagram, depicting a system for central distribution of key derivation parameters as known in the art.

Reference is now made to FIG. 2, which depicts a system for central distribution of key derivation parameters as known in the art. As shown in FIG. 2, a computer network 20 may include one or more computing devices that may be communicatively inter-connected by wired and/or wireless network components, including for example: network hubs, switches, routers and gateways in a computer network, as known in the art.

For example, elements T (e.g., T1-A through T3-C) may be terminal computers and may each be or may include at least one computing device (e.g., some or all components of FIG. 1). Terminals T1-A through T3-C may be interconnected, for example, via a Local Area Network (LAN), a Wide Area Network (WAN) such as the internet, a cellular network, and the like.

In another example, T1-A through T3-C may be divided to smaller, homogenous local networks. For example: T1-A, T1-B and T1-C may be terminals pertaining to a first organizational computer network (e.g., of a merchant M1), T2-A, T2-B and T2-C may be terminals pertaining to a second organizational computer network (e.g., of merchant M2) and T3-A, T3-B and T3-C may be terminals pertaining to a third organizational computer network (e.g., of merchant M3).

The term homogenous' is used herein in relation to local networks (e.g., M1) to refer to at least one parameter that may be common to all computing devices that may be included in the local network. For example, local network M1 may be homogenous in the sense that it may include a single network segment, having direct connection to at most one network switching and/or routing element; and that it may be included in a single address space, such as one subnet of an internet protocol (IP) network, as known in the art.

In another example, at least one computing device T (e.g., T1-A through T3-C) may be connected to a processing center 10. Pertaining to the example of computing devices that T1-A through T3-C that are POS terminals installed at computer networks of one or more merchants, processing center 10 may be a banking server, configured to receive at least one parameter of a commercial transaction (e.g., a personal identification number (PIN) of a credit card). In typical implementations, processing center 10 may be a well-secured computing system that may be difficult to infiltrate or hack (e.g., by physically tapping into a communication line or channel therein) and may serve to distribute a secure key and/or KDP.

As shown in FIG. 2, at least one computing system (e.g., T1-A through T3-C, processing center 10) may distribute a secure key and/or KDP R1 to one or more computing device(s) in network 20. A perpetrator P1 (represented here by computing device P1; perpetrator P1 is typically a computing device such as in FIG. 1 operated possibly remotely by a person) may hack or attack a communication channel between a first computing device, distributing the secure key and/or KDP and a second, target computing device, to establish a man-in-the-middle (MITM) configuration, as shown by the X sign. In this configuration, perpetrator P1 could alter the communication between the first and second computing devices. Specifically, perpetrator P1 may alter or inject a key-derivation parameter (KDP) R1' that may be different than R1, to set a value of at least one derived secure key, and thus be able to decipher data that may be transferred between the first and second computing devices.

Figure 3:
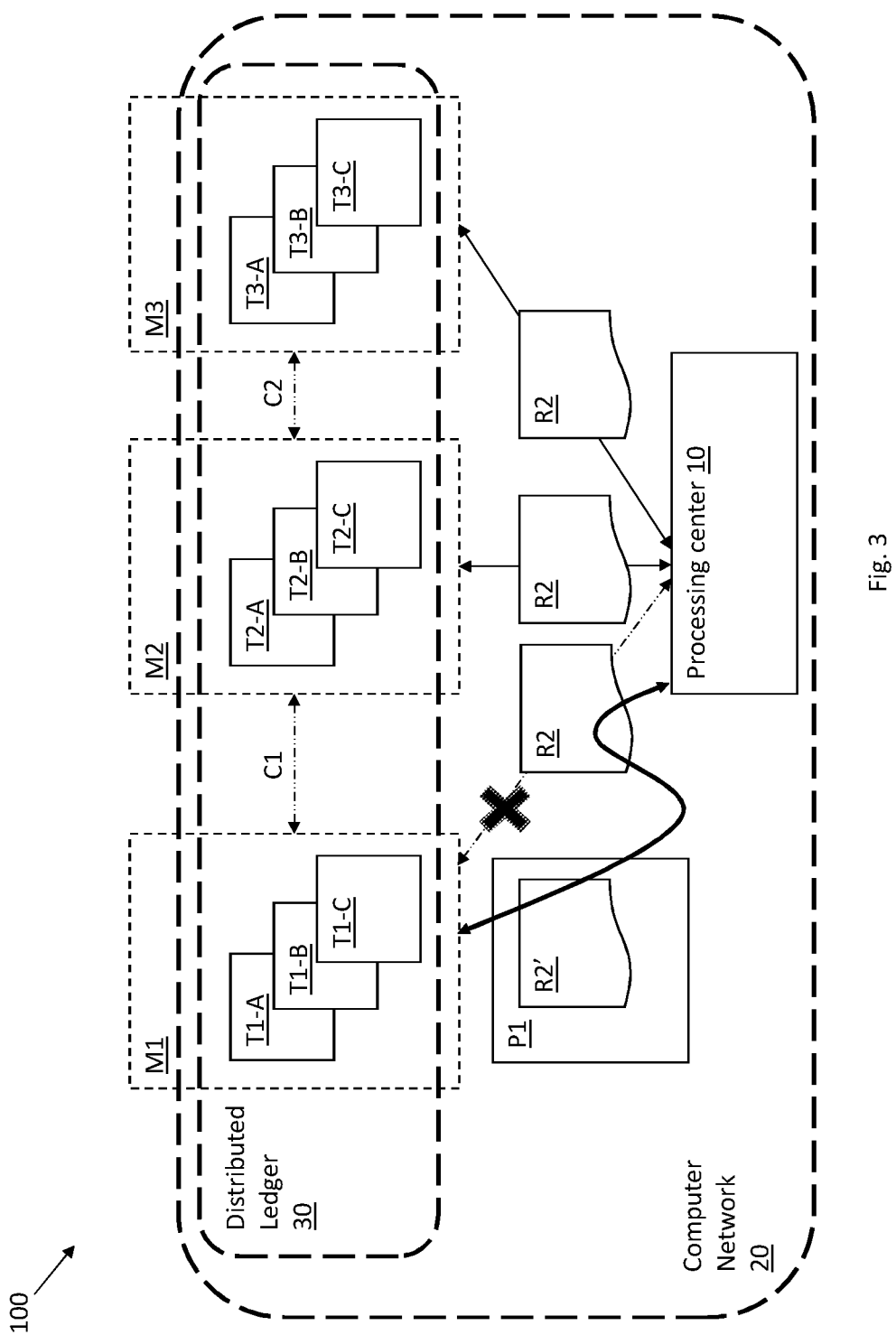
FIG. 3 is a block diagram, depicting a system for protection of computer networks against attacks such as man-in-the-middle attacks, according to some embodiments.
Figure 4:
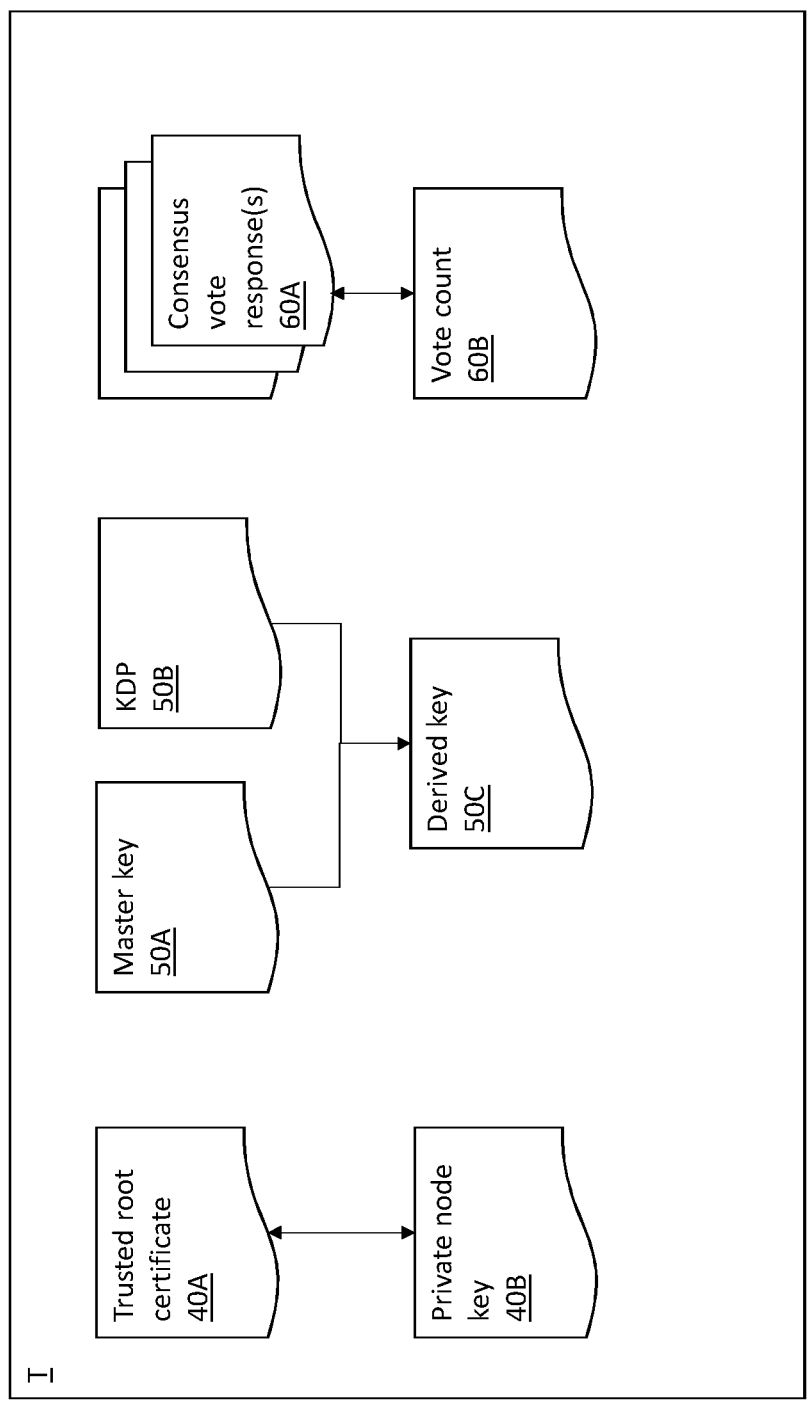
FIG. 4 is a block diagram depicting data elements that may be included within one or more nodes of a computer network.

Reference is now made to FIG. 3, which is a block diagram depicting a system 100 for protection of computer networks (e.g., computer network 20) against attacks such as MITM attacks, according to some embodiments. Reference is further made to FIG. 4, which is a block diagram depicting data elements that may be included within one or more nodes T of computer network 20. As shown in FIG. 3, the structure of computer network 20 included in system 100 may be substantially identical to that described herein in relation to FIG. 2.

According to some embodiments, each node T (e.g., T1-A through T3-C) may be initialized or loaded with a secret master key 50A, which may be used for deriving one-time secure keys 50C, as known in the art.

Additionally, or alternately, each node T may also store (e.g., on storage device 6 of FIG. 1) an individual, proprietary private node key 40B and a trusted public root certificate 40A, that may be used for sending signed messages among nodes T as known in the art and as explained herein.

Protection of computer network 20 from attacks such as MITM attacks may be based on sharing information among two or more computing devices T (e.g., T1-A through T3-C) via a distributed ledger 30 configuration.

As known in the art, distributed ledger 30 may be a distributed database that is shared, replicated, and synchronized among nodes T of a decentralized network (e.g., network 20), without using a central authority or third-party mediator. The term 'distributed' is used herein to indicate that the database is not maintained or stored by a single computing device or entity, but rather cumulatively kept (e.g., on multiple copies) by two or more nodes T, as known to persons skilled in the art of blockchain and/or distributed ledger databases.

Distributed ledger 30 may record transactions (e.g., exchange of data among nodes T in network 20) and may store the recorded data in local copies of the distributed database. The term 'local', relative to a certain device, is used herein to imply storage of the recorded data on a storage device (e.g., element 6 in FIG. 1) or memory device (e.g., element 4 in FIG. 1) that may be included in or associated with that specific computing device (e.g., a specific node T participating in distributed ledger 30).

Every record in the distributed ledger may have a timestamp and/or a unique cryptographic signature, thus making the ledger an auditable history of transactions in the network.

As known in the art, nodes T that participate in ledger 30 may govern and agree by consensus on updates to the records in ledger 30. For example, a first node T may initiate a vote, and communicate a vote request to at least a subset of the other participating nodes T. Each of the subset of nodes T may receive the request and vote by responding (e.g., with a binary True/False answer) to the requested vote. Each of the subset of nodes T may receive (e.g., from all other voting nodes T) their respective responses 60A and may accumulate the vote responses in an overall vote count 60B. Each of the subset of nodes T may consequently determine (e.g., in an individual, distributed manner) whether the vote has passed or failed according to the majority of votes in the vote count 60B. Each of the subset of nodes T may subsequently update their local copy of the distributed database according to the outcome of the vote (e.g., passed or failed).

An administrative user may create a distributed ledger configuration 30, and configure (e.g., via input device 7 of FIG. 1) one or more nodes T (e.g., T1-A, T1-B, etc.) of network 20 to be included within distributed ledger configuration 30.

The one or more nodes T (e.g., T1-A through T3-C) may be configured (e.g., by the administrator) to participate or be included in distributed ledger 30 configuration. As known in the art, each participating node may be associated with each other participating node in distributed ledger 30, in the sense that each node may be configured (e.g., by an administrator) to recognize data transmissions that may originate from all other associated nodes T participating in ledger 30.

Each node T participating in distributed ledger 30 may hold distributed information regarding KDPs and/or secure keys of network 20. Nodes T may be interconnected (e.g., via network 20) and may communicate among themselves, as known in the art of distributed ledgers, to synchronize the information associated with distributed KDPs 50B and/or secure keys of network 20.

At least one node T may include or may be associated with a storage device (e.g., element 6 in FIG. 1), upon which node T may maintain a database. The database may include at least one entry, including a local copy of information associated with a distributed KDP 50B. In some embodiments, the information 50B may include a value of at least one specific KDP and a respective timestamp, corresponding to a timing at which node T may have received the specific KDP.

As shown in FIG. 3, a computing device (e.g., a node T, processing center 10, etc.) of computer network 20 may select a value of at least one key derivation parameter (KDP) and produce a request R2 to set the KDP value, so as to produce a value of a one-time derived secure key.

The requesting computing device (e.g., node T) may send request message R2, including the requested value to other nodes T in distributed ledger 30 (e.g., other than requesting node T) and may sign the request message with its proprietary private node key 40B and a trusted root certificate 40A, as known in the art.

For example, a requesting node (e.g., T1-A) may sign request message R2 with a proprietary private node key 40B, dedicated for signing outgoing messages. The proprietary private node key 40B itself may be signed by a certificate 40A of a trusted root entity such as a certificate authority (CA), as known in the art. A receiving entity (e.g., node T1-B, other than requesting node T1-A) may receive request message R2 and may validate the signature of requesting node T1-A in at least one of the following ways:

- if the receiving entity T1-B knows and trusts the proprietary private node key 40B of requesting node T1-A, then T1-B may validate the authenticity of request message R2 based on the value of requesting nodes T1-A's proprietary private node key 40B.
- if the receiving entity T1-B does not know and/or trust the proprietary private node key 40B of requesting node T1-A, then T1-B may validate the authenticity of request message R2 based on the certificate 40A of the trusted root entity (e.g., the certificate authority).

A subset (e.g., two or more) of nodes T participating in distributed ledger 30 may perform or participate in a vote of confidence (also referred to in the art as a consensus vote) regarding the validity of the request.

For example, if request R2 was signed using a trusted root certificate 40A and/or a valid private key 40B signed by the first, requesting node T (e.g., T1-A), then a second node T (e.g., T2-B) participating in the consensus vote may vote in agreement of the changed KDP (e.g., vote: 'True'). In a complementary manner, if the request was not properly signed as explained, then second node T (e.g., T2-B) may vote against the change (e.g., vote: 'False').

As elaborated herein, each of nodes T participating in the vote may individually, and in a distributed manner count the vote responses 60A and determine (e.g., according to the majority of ballots in the vote count 60B) whether the vote has passed or failed.

System 100 may thus, as a whole, determine whether the request for setting a KDP value originated from a legitimate request (e.g., by a node T of computer network 20, such as nodes T1-A through T3-C or processing center 10) or whether it originated from an attack such as an MITM attack, originated by perpetrator P1, according to the outcome of the vote of confidence or consensus vote:

If the vote fails (e.g., a majority of nodes vote against the change) then member nodes T of distributed ledger 30 may determine that the request is not valid and that an attack (e.g., an MITM attack) on at least one node T has occurred.

If the consensus vote succeeds (e.g. more votes saying legitimate than votes saying attack), member nodes T of distributed ledger 30 may determine that the request for setting a KDP was legitimate.

At least one second node T of the nodes participating in the vote may validate the requesting node's signature of request R2. For example, second node T may verify that the key used to sign request R2 was signed by a root certificate authority (CA). The at least one second node T may subsequently store the KDP value included in request R2 in the entry of the local copy of the distributed ledger 50B (e.g., on element 6 of FIG. 1).

An improvement of the present invention (as depicted in the example of FIG. 3) over prior art (as depicted in FIG. 2) may be evident by comparing FIG. 2 and FIG. 3, as elaborated herein.

As shown in FIG. 2 and FIG. 3, computer network 20 may include two or more separate entities (e.g., M1, M2, M3) of homogenous network topology, each entity including one or more nodes (e.g., T1-A, T1-B and T1-C for M1, etc.). For example, M1 may be a LAN associated with a specific merchant or shop, and T1-A, T1-B and T1-C may be POS terminals included in the LAN of M1.

In some embodiments, computer network 20 may include at least one processing center 10 (e.g., a banking server), separate from the two or more entities of homogenous network topology (e.g., merchant networks M1, M2, M3). As explained herein, and as depicted in the examples of FIG. 2 and FIG. 3, in some centralized constellations of network 20, processing center 10 may produce a request (R1, R2) to set a value of at least one key derivation parameter.

In FIG. 3, the different nodes T of all entities may be configured to participate in or be associated or linked in the distributed ledger configuration 30, as explained herein. For example, at least one computing system or node T (e.g., T1-A) of a first homogenous network entity (e.g., M1) may be securely connected (e.g., C1) to at least one computing system or node T (e.g., T2-A) of a second homogenous network entity (e.g., M2).

The secure network connections (e.g., C1, C2) between homogenous network entities (e.g., M1, M2, M3) may include any known physical or logical network security module (e.g., a Firewall, a demilitarized-zone network (DMZ), and the like) as known in the art, to facilitate secure traffic of messages that are associated with votes of confidence of the distributed ledger configuration 30. In some embodiments, secure network connections (e.g., C1, C2) may facilitate only traffic of messages pertaining to votes of confidence of the distributed ledger configuration 30, and may not transfer messages pertaining to other communication over computer network 20.

For example, at least two nodes (e.g., T1-A and T2-A) of separate homogenous network entities (e.g., M1 and M2 respectively) may be implemented as nodes in a Virtual Private Network (VPN) and secure network connections C (e.g., C1, C2) may communicate over an existing common internet connection. In another example, T1-A and T2-A may be implemented as nodes in a license-free sub-GHz wireless wide area network (WAN). In yet another example, T1-A and T2-A may be implemented as nodes in a VPN network, and secure network connections C may communicate using a wireless modem to utilize an internet connection separate from that of processing center 10.

Additionally, or alternately, at least two devices (e.g., belonging to different homogenous network topology entities M may communicate directly with each other, not through network 20.

As shown in FIG. 2 and FIG. 3, a perpetrator P1 may hijack or infiltrate (e.g. participate in without permission or by impersonation) a communication connection link or line (e.g., a physical cable line connecting between computer network entities such as routers, switches, hubs, etc.) between two entities of the computer network 20, to inject a KDP according to their preference. For example, as depicted in both figures, perpetrator P1 may hijack the communication between processing center 10 and at least one node T of homogenous network entity M1. Perpetrator P1 may thus produce a malicious request (e.g., R1', R2') to set a KDP on homogenous network entity M1.

In FIG. 2, representing an example of the state of the art, perpetrator P1 may have successfully injected R1', and may thus become able to decipher messages that are conveyed within homogenous network entity M1, and between M1 and processing center 10. In this condition, implementation of an additional, distributed security measure such as a blockchain or distributed ledger among the nodes of M1 will not have solved this problem.

In contrast, as shown in FIG. 3 depicting an example of an embodiment of the present invention, perpetrator P1 may initially manage to 'fool' at least one terminal (e g, T1-A) of M1 to believe a request R2' is legitimate, however the subsequent vote of confidence among computing devices (e.g., terminal nodes) that participate in distributed ledger 30, including nodes from beyond M1 (e.g., nodes T of entity M2 and M3), over secure communication channels (e.g., C1, C2) may detect and prevent the attack. For example, nodes T of M2 and M3 may vote against the malicious KDP included in R2', as they have not received message R2' from perpetrator P1, resulting in an overall vote against the KDP of R2'. Each of the nodes T participating in the vote may independently count the vote responses 60A of all other participating nodes T and may thus individually determine that an attack has been attempted.

In order to 'fool' (e.g., inject a selected KDP) a terminal (e.g., T1-A) of a homogenous network entity (e.g., M1), perpetrator P1 may need to concurrently hijack or infiltrate a plurality of communication connections, so as to bypass the defense provided by the distributed ledger 30. The term 'concurrent' is used in this context to refer to a time frame that is close enough so as to prevent system 100 from recognizing an attack via a first communication connection and taking preemptive measures, prior to initiating an attack via a second communication connection.

For example, perpetrator P1 may need to:
concurrently hijack the communication between processing center 10 and M1 (as shown) and the communication between processing center 10 and M2; or
concurrently hijack the communication between processing center 10 and M1 (as shown) and C1 (between M1 and M2), and the like.

This requirement significantly drops the probability of a successful attack, and provides an improvement of security over prior art.

As explained herein, nodes T of distributed ledger 30 may store a KDP value 50B that may be included in a request (e.g., R2 of FIG. 3) in an entry of a local copy of the distributed ledger on an associated storage device (e.g., element 6 of FIG. 1), as known in the art. In some embodiments, nodes T of distributed ledger 30 may perform a vote of confidence or consensus on the validity of at least one locally stored KDP value 50B, during or following at least one data transaction on network 20.

For example, a first node T may receive (e.g., from a requesting node T, from processing center 10, from perpetrator P1, etc.) a request (e.g., R2, R2') to set a KDP value, and may store the value 50B in an entry of a local copy of distributed ledger 30.

First node T may be required to send an encrypted message to a second node T in network 20. First node T may thus derive a secure key 50C according to its master key 50A, and according to the locally stored KDP 50B to produce a derived secure key, as known in the art. First node T may subsequently encrypt the message according to derived secure key 50C as known in the art.

According to some embodiments, first node T may then send the encrypted message, alongside or in conjunction with, or in the same communication with, an identification of the distributed ledger entry (e.g., a timestamp at which the corresponding request R2 was received) to the second node T.

Second node T may send a request message to at least a subset of nodes of distributed ledger 30, including a request to perform a vote of confidence or consensus from the subset of nodes T, to establish the validity of the key derivation parameter (KDP) value in the identified distributed ledger entry.

If the second node T determines, as explained herein, that the vote of confidence has passed or succeeded (e.g., greater than 50% of nodes T of the subset of nodes agree to the value of the KDP, or vote that the KDP is legitimate), then second node T may derive a secure key 50C according to the KDP value 50B and according to its own master key 50A, to decipher the encrypted message.

If, on the other hand, the second node T determines, as explained herein, that the vote of confidence has failed, or determined that the KDB is not legitimate (e.g., 50% or less of the nodes T of the subset of nodes agree to the value of the KDP or vote that the KDP is legitimate), then second node T may identify the KDP value as pertaining to a suspected attack (e.g., an MITM attack) on computer network 20.

In some embodiments, having identified a KDP as originating from a suspected attack such as an MITM attack, second node T may take at least one preventive measure to repulse or defend against the suspected attack.

For example, second node T may produce a warning notification (e.g., a message via output device 8 of FIG. 1) regarding the suspected MITM attack, including for example at least one parameter associated with the origin of the attack (e.g., an identification of the requesting node, an identification of the first node, etc.), the time of attack (e.g., a timestamp included within the entry of the local copy of the distributed ledger), etc.

In some embodiments, second node T may display content of the warning notification (e.g., on a user interface included in output device 8 of FIG. 1) to an administrative user, who may take required action according to their considerations.

Alternately, or additionally, at least one computing device in computer network 20 (e.g., a third node T, other than second node T) may receive the warning notification, and may store the content of the warning notification, such as the timing of the suspected attack and properties of the involved nodes on a storage device (e.g., storage device 6 of FIG. 1).

Third node T may be configured to subsequently apply security measures according to the stored warning notifications. For example, third node T may perform at least one of:
block at least one message that may originate from the first node;
quarantine at least one message originating from the first node;
produce a request (e.g., R2) to change a value of the at least one non-compromised KDP;
produce a second warning notification to one or more other nodes T regarding a message received from first node T, and the like.

Figure 5:
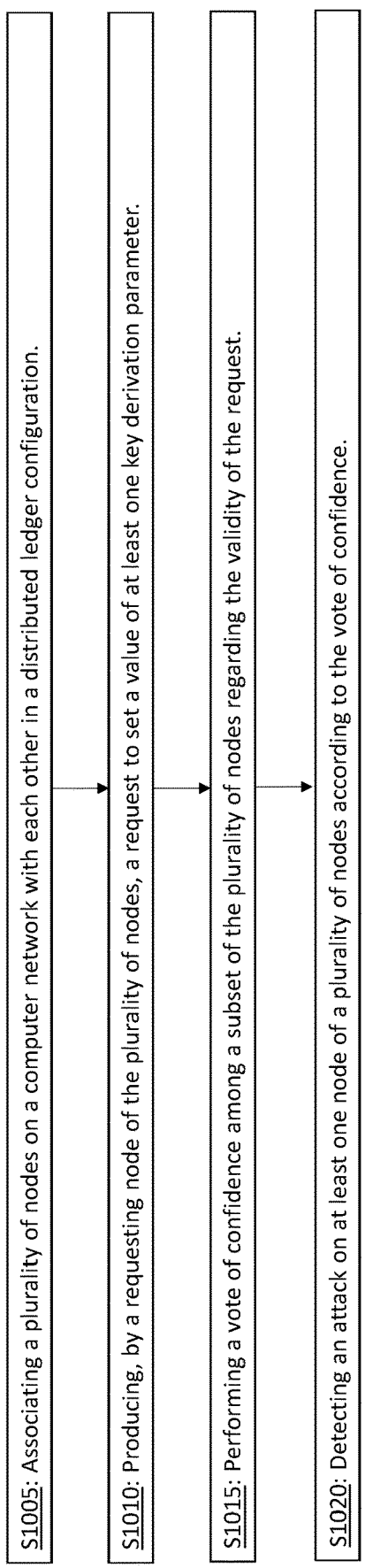
FIG. 5 is a flow diagram, depicting a method for protection of computer networks against man-in-the-middle attacks according to some embodiments.

Reference is now made to FIG. 5 which is a flow diagram, depicting a method for detection and/or protection of a computer network (e.g., element 20 of FIG. 3) including a plurality of nodes T against attacks (e.g., MITM attacks) according to some embodiments.

As shown in step S1005, the plurality of nodes may be associated (e.g., by an administrator) with each other in a distributed ledger configuration.

As shown in step S1010, at least one processor (e.g., element 2 of FIG. 1) of a requesting node T of the plurality of nodes T may produce a request to set a value of at least one key derivation parameter (KDP).

As shown in step S1015, at least one processor 2 of a node T may perform a vote of confidence or consensus among a subset of the plurality of nodes regarding the validity of the request, as known to persons skilled in the art.

As shown in step S1020, at least one processor 2 of a node T may detect an attack on at least one node T of the plurality of nodes of computer network 20 according to the vote of confidence.

Embodiments of the present invention provide methods for improving the security of computer communication networks (e.g., against MITM attacks) by forcing a perpetrator to concurrently hijack or infiltrate (e.g. participate in without permission or by impersonation) a plurality of communication connection links or lines (e.g., physical cable lines connecting between computer network entities such as routers, switches, hubs, etc.) of computer network 20.

Attacks, security breaches or infiltrations other than MITM attacks may be detected and acted upon, according to embodiments of the present invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method of detection, by at least one processor, of an attack on a computer network comprising a plurality of nodes, the method comprising:
    associating the plurality of nodes with each other in a distributed ledger configuration;
    producing, by a requesting node of the plurality of nodes, a request to set a value of at least one key derivation parameter;
    performing a vote of confidence among a subset of the plurality of nodes regarding the validity of the request; and
    detecting an attack on at least one node of a plurality of nodes according to the vote of confidence
    loading to each of the plurality of nodes a master key;
    deriving, by a first node, a secure key according to the master key and according to a key derivation parameter stored on a local copy at the first node of the distributed ledger;
    encrypting, by the first node, a message according to the derived key;
    sending the encrypted message, alongside an identification of the distributed ledger entry, to an at least one second node in the network;
    requesting, by the at least one second node, a vote of confidence from the subset of nodes, regarding the validity of the key derivation parameter value in the identified distributed ledger entry;
    if the vote of confidence passes then deriving, by the second node, a secure key according to the key derivation parameter value and deciphering the encrypted message;
    if the vote of confidence fails then identifying the key derivation parameter value as pertaining to a suspected attack on the computer network and performing at least one preventive measure thereupon.

2. The method of claim 1, wherein the attack is one of a man-in-the-middle (MITM) attack, a selected key attack and a targeted key attack.

3. The method of claim 1, further comprising loading to each of the plurality of nodes a proprietary private node key, and wherein producing a request to set a value of at least one key derivation parameter by a first node comprises:
    selecting a value of at least one key derivation parameter;
    sending a request message to the plurality of nodes other than the first node; and
    signing the request message with the proprietary private node key.

4. The method of claim 3, wherein at least one second node is configured to:
    validate the requesting node's signature of the request; and
    store the key derivation parameter value in an entry of a local copy stored at the second node of the distributed ledger, based on the validation.

5. The method of claim 1, wherein the preventive measures are selected from a list comprising: producing a notification regarding the suspected attack, blocking at least one message originating from the first node, quarantining at least one message originating from the first node, and producing, by a node other than the first node, a request to change a value of the at least one key derivation parameter.

6. The method of claim 1, wherein the computer network comprises a plurality of separate entities of homogenous network topology, each entity comprising one or more nodes, and wherein the nodes of all entities are associating in a distributed ledger configuration.

7. The method of claim 6, wherein at least one first node of a first homogenous network entity is communicatively connected to at least one second node of a separate, second homogenous network entity over a secure connection.

8. The method of claim 7, wherein the at least one first node and the at least one second node are implemented as nodes in a Virtual Private Network (VPN), and wherein the secure network connection is performed over the computer network.

9. The method of claim 7, wherein the at least one first node and the at least one second node are communicatively connected by a secure network connection separate from the computer network.

10. The method of claim 6, wherein the computer network comprises at least one processing center, separate from the plurality of entities of homogenous network topology, and wherein producing a request to set a value of at least one key derivation parameter is performed by the processing center.

11. A system for detection of an attack on a computer network comprising a plurality of nodes, wherein each node comprises:
    a non-transitory memory device, wherein modules of instruction code are stored and
    a processor associated with the memory device, and configured to execute the modules of instruction code, whereupon execution of said modules of instruction code, the processor is configured to:
    associate the plurality of nodes with each other in a distributed ledger configuration;
    produce, by a requesting node of the plurality of nodes, a request to set a value of at least one key derivation parameter;

perform a vote of confidence among a subset of the plurality of nodes regarding the validity of the request; and detecting an attack on at least one node of a plurality of nodes according to the vote of confidence load to each of the plurality of nodes a master key;

derive, by a first node, a secure key according to the master key and according to a key derivation parameter stored on a local copy at the first node of the distributed ledger;

encrypt, by the first node, a message according to the derived key;

send the encrypted message, alongside an identification of the distributed ledger entry, to an at least one second node in the network;

request, by the at least one second node, a vote of confidence from the subset of nodes, regarding the validity of the key derivation parameter value in the identified distributed ledger entry;

if the vote of confidence passes then deriving, by the second node, a secure key according to the key derivation parameter value and deciphering the encrypted message;

if the vote of confidence fails then identifying the key derivation parameter value as pertaining to a suspected attack on the computer network and performing at least one preventive measure thereupon.

12. The system of claim 11, wherein the attack is one of an MITM attack, a selected key attack and a targeted key attack.

13. The system of claim 11, wherein each of the plurality of nodes is loaded with a proprietary private node key, and wherein at least one processor of a first node is configured to produce a request to set a value of at least one key derivation parameter by:

selecting a value of at least one key derivation parameter;

sending a request message to the plurality of nodes other than the first node; and signing the request message with the proprietary private node key.

14. The system of claim 13, wherein at least one processor of at least one second node is configured to:

validate the requesting node's signature of the request; and store the key derivation parameter value in an entry of a local copy stored at the second node of the distributed ledger, based on the validation.

15. The system of claim 11, wherein at least one processor is configured to perform at least one preventive measure, selected from a list comprising:

producing a notification regarding the suspected attack;

blocking at least one message originating from the first node;

quarantining at least one message originating from the first node; and producing, by a processor of a node other than the first node, a request to change a value of the at least one key derivation parameter.

16. The system of claim 11 wherein the computer network comprises a plurality of separate entities of homogenous network topology, each entity comprising one or more nodes, and wherein the nodes of all entities are associating in a distributed ledger configuration.

17. The system of claim 16, wherein at least one first node of a first homogenous network entity is communicatively connected to at least one second node of a separate, second homogenous network entity over a secure connection.

18. The method of claim 16, wherein the computer network comprises at least one processing center, separate from the plurality of entities of homogenous network topology, and wherein producing a request to set a value of at least one key derivation parameter is performed by the processing center.

19. A method of detection, by at least one processor, of an attack on a computer network comprising a plurality of nodes, the method comprising:

creating a distributed ledger recording transactions among the plurality of nodes;

creating, by at least one node, a request to set a value of at least one key derivation parameter;

voting, among a subset of the plurality of nodes, whether or not the request is valid;

detecting an attack if the outcome of the vote is that the request is not valid loading to each of the plurality of nodes a master key;

deriving, by a first node, a secure key according to the master key and according to a key derivation parameter stored on a local copy at the first node of the distributed ledger;

encrypting, by the first node, a message according to the derived key;

sending the encrypted message, alongside an identification of the distributed ledger entry, to an at least one second node in the network;

requesting, by the at least one second node, a vote of confidence from the subset of nodes, regarding the validity of the key derivation parameter value in the identified distributed ledger entry;

if the vote of confidence passes then deriving, by the second node, a secure key according to the key derivation parameter value and deciphering the encrypted message;

if the vote of confidence fails then identifying the key derivation parameter value as pertaining to a suspected attack on the computer network and performing at least one preventive measure thereupon.

* * * * *